(12) United States Patent
Koppang

(10) Patent No.: US 6,301,752 B1
(45) Date of Patent: Oct. 16, 2001

(54) CORD ORGANIZER

(76) Inventor: Scott Koppang, P.O. Box 8248, Portland, OR (US) 97207

(*) Notice: Subject to any disclaimer, the term of this patent is extended or adjusted under 35 U.S.C. 154(b) by 0 days.

(21) Appl. No.: 09/475,482

(22) Filed: Dec. 30, 1999

(51) Int. Cl.[7] .............. B65D 63/00; F16B 2/22; F16G 11/00
(52) U.S. Cl. ........ 24/129 R; 24/16 PB; 24/17 B; 24/115 M; 24/127
(58) Field of Search .............. 24/16 PB, 17 B, 24/129 R, 115 M, 127

(56) References Cited

U.S. PATENT DOCUMENTS

| | | |
|---|---|---|
| D. 372,188 | 7/1996 | Van Dyke . |
| D. 374,174 | 10/1996 | McClellan . |
| D. 408,365 | 4/1999 | Sanders . |
| 613,710 * | 11/1898 | Orr .................... 24/129 R |
| 3,691,510 | 9/1972 | Lehmann . |
| 3,924,819 | 12/1975 | Lapinskas . |
| 4,235,232 * | 11/1980 | Spaven et al. .......... 128/214.4 |
| 4,285,486 | 8/1981 | Von Osten et al. . |
| 4,454,374 | 6/1984 | Pollack . |
| 4,475,649 | 10/1984 | Haarbosch . |
| 4,780,935 | 11/1988 | Palombit . |
| 4,854,014 * | 8/1989 | Ueno ..................... 24/16 PB |
| 4,878,586 | 11/1989 | Bancroft et al. . |
| 4,904,827 | 2/1990 | Potter et al. . |
| 4,991,265 * | 2/1991 | Campbell et al. ........ 24/16 PB |
| 5,130,496 | 7/1992 | Jenkins et al. . |
| 5,293,668 * | 3/1994 | Tibiletti .................. 24/16 PB |
| 5,372,146 * | 12/1994 | Branch .................. 24/16 PB |
| 5,397,243 | 3/1995 | MacMurdo, Sr. . |
| 5,470,249 | 11/1995 | Manganello . |
| 5,573,422 | 11/1996 | Lawliss . |
| 5,655,272 * | 8/1997 | Young .................... 24/17 B |
| 5,901,712 | 5/1999 | St. Peter . |
| 5,906,507 | 5/1999 | Howard . |
| 5,935,112 * | 8/1999 | Stevens et al. ............ 604/256 |

FOREIGN PATENT DOCUMENTS

| | | | |
|---|---|---|---|
| 0034187 * | 3/1908 | (AT) | .................. 24/129 R |
| 1214658 * | 12/1970 | (GB) | .................. 24/129 R |
| 2016579 * | 9/1979 | (GB) | .................. 24/129 R |
| 0346025 * | 1/1937 | (IT) | .................. 24/115 M |

\* cited by examiner

*Primary Examiner*—Victor N. Sakran
(74) *Attorney, Agent, or Firm*—ipsolon llp

(57) ABSTRACT

A elongate cylindrical body member has a longitudinal interior passageway formed therethrough for receiving folded, bundled cords such as electrical power cords and other wiring. The interior diameter of the passageway decreases gradually and smoothly radially inwardly from the opposite outer ends of the passageway toward its center. The folded cord is retained in the interior passageway through the body. The organizer may be used with cords that are in use with appliances and the like to keep the cords organized and out of the way, and may be used to efficiently store cords that are not being used.

11 Claims, 1 Drawing Sheet

CORD ORGANIZER

FIELD OF THE INVENTION

This invention relates to an apparatus for organizing and storing electrical cords and other wiring, and ropes and the like.

BACKGROUND AND SUMMARY OF THE INVENTION

Manufacturers generally ship products that have electrical power cords with the cords neatly bundled and secured to minimize shipping space and to present a neat and attractive package to the consumer. Most consumers are familiar with the standard manner that manufacturers use to bundle electrical cords with new appliances and the like: the power cord is neatly folded over onto itself in an accordion-like manner into a bundle that is tightly secured near the center of the bundle with a tie wire or other similar tying device. With the power cords folded back over themselves in this familiar manner and the folded cord tied near the center point of the bundle, the cord is held in a bundle that is shaped somewhat like a figure eight—the center of the bundle where the tie wire is located is constricted relative to the outer ends of the bundle where the cord is folded over on itself.

But most any consumer will also recognize that once the original tie wire that secures the bundled cord is undone, it is very difficult to re-bundle the cord—at least in any fashion that resembles the original, neat bundle that the manufacturer supplied. Indeed, once the originally bundled cord is untied, that may be the last time the cord is ever so neatly organized.

Consumers can readily identify with the problems associated with unbundled electrical power cords. For instance, the excess length of cord is often in the way, often stuffed by the consumer behind the appliance. But power cords are notorious for working their way out from behind appliance, sometimes presenting a risk of tripping a passerby, resulting in injury. But the problem is not limited to electrical power cords. With the advent of enhanced telecommunications and efficient and reasonably priced office equipment, the number of cords used in homes and businesses has increased dramatically. Most residences and nearly all businesses use computers, monitors, printers, fax machines and copy machines, in addition to the more standard appliances that might be used. All of these devices require electrical power cords, and most are used with electrical surge protectors that have separate power cords. Most computers also require telephone cords, and it is not unusual to have separate telephone cords running from wall jacks to the computer, the fax, and the telephone. The result is all too familiar to most people: a jumbled mess of tangled cords.

The problem of unorganized cords is not limited to the situation where the cord is in use. Thus, since consumers seem to rely on so many different types of power cords and other wiring it is not at all unusual to have extra cords such as extension cords, spare telephone cords, spare printer cables and the like. Once manufacturer's original bundling of these cords is undone it is hard to rebundle the cord back to its original, neat package. The result again is a tangled mess of cords, often stuffed away in some drawer.

There is a need therefore for a simple device for storing and organizing electrical power cords and other wiring such as phone cables and the like whether the cords are in use or are being stored. There are several prior art devices intended to facilitate the storage and organization of electrical power cords. For example, both U.S. Pat. Nos. 4,285,486 and 4,878,586 disclose holders design for cords. In the '486 patent the invention includes an elongate cylinder suitable for receiving a coiled or bundled electrical cord. The cylinder is attachable to a bracket so that the combination can be fixed to, for instance, a wall. The '586 patent also discloses a tubular member into which the folded cord is inserted. This patent includes a wall-mounted rack for holding the folded cord and the tubular member.

While both of the inventions disclosed in these patents are useful for organizing cords, none are designed to take advantage of the geometric configuration of a folded cord and to thereby hold the cord in the most efficient manner.

In one preferred embodiment of the present invention an elongate cylindrical member is provided for storing and organizing wiring such as electrical power cords, telephone cords and the like, and other foldable cords such as rope. In this sense the word "cord" is used somewhat generically herein. The device may be used in situations where the cord is in use with, for example, an appliance, computer or the like. In these cases the apparatus functions as a keeper and organizer for the cord that prevents tangling with other cords. Likewise, the inventive device may be used to store cords that are not being used and to keep them organized and free from tangling with other cords.

The cylindrical member may be sized according to the size and gauge of the cord with which it is intended for use. But regardless of the size of the device, the same structural features are used to provide an effective apparatus for storing and organizing cords. In a preferred embodiment the cylindrical member has an axial passageway formed therethrough. The passageway or opening through the member has a first diameter at each outer end. The diameter of the opening through the member decreases smoothly and radially inwardly from each outer end toward a central area of the passageway, where the opening through the tube has a constricted diameter relative the rest of the tube and has its smallest diameter. The resulting tubular member is uniquely configured to hold an appropriately sized cord that is folded over onto itself in an essentially figure eight orientation.

DETAILED DESCRIPTION OF PREFERRED EMBODIMENTS

Figure 1:
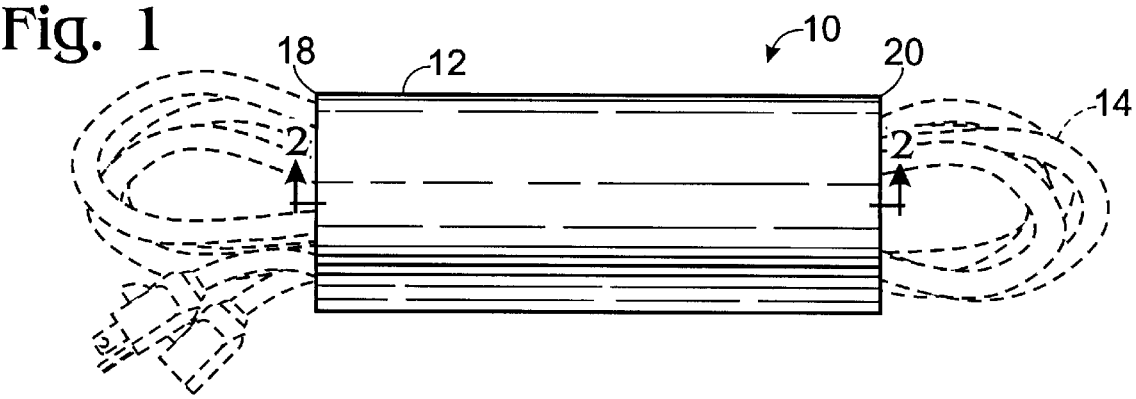
FIG. 1 is a side elevation view of one preferred embodiment of the cord organizer according to the present invention with an electrical power cord shown in phantom lines.
Figure 2:
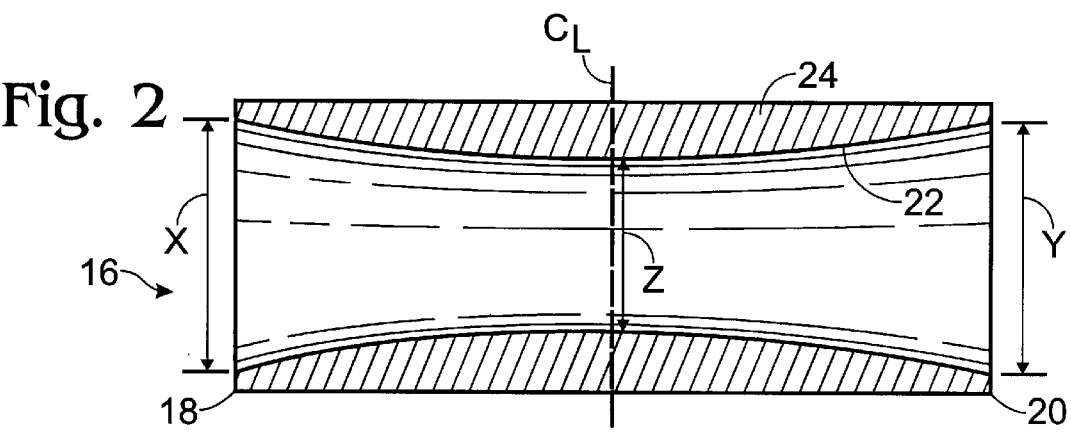
FIG. 2 is a cross sectional view of the cord organizer shown in FIG. 1, taken along the line 2—2 of FIG. 1.

Referring to FIG. 1, a preferred embodiment of a cord organizer 10 according to the present invention is shown as a body member 12 configured for receiving a folded cord 14, which in the illustration of FIG. 1 is a standard electrical power cord that is not in use (i.e., both ends of the cord are unplugged), in an axial passageway 16, which is shown in cross section in FIG. 2. Referring to FIG. 2, body member 12 is seen as an elongate cylindrical body with axial passageway 16 formed longitudinally through the body. The interior diameter of the opening into passageway 16 at the first end 18 of body member 12 is referred to as diameter X.

The interior diameter of the opening into passageway 16 at the second, opposite end 20 of body member 12 is referred to as diameter Y. In the preferred embodiment diameter X is substantially the same as diameter Y.

The interior dimensions of passageway 16 are configured to facilitate storing and organizing electrical cords and other kinds of wiring when they are in the well-known manner illustrated by cord 14 in FIG. 1. When a cord is folded over itself in this accordion-like manner the folded bundle naturally takes on the shape of a figure eight—the outer ends of the bundle are thicker where the cord folds back on itself and the center of the bundle is relatively thinner. That is, a circumference around the bundle of cord is relatively greater near the outer opposite ends of the bundle than a circumference around the bundle near the middle. Accordingly, as shown in FIG. 2, body member 12 is formed with the interior diameter Z of passageway 16 at or near the center point $C_L$ of the member smaller than diameters X and Y. This is accomplished by forming body member 12 such that interior surface 22 of body member wall 24 is smoothly and gradually curved radially inwardly moving in the direction from first end 18 toward center point $C_L$, and likewise and symmetrically radially inwardly moving in the direction from second end 20 toward center point $C_L$. That is, the interior surface 22 of wall 24 is formed with respect to the longitudinal axis through the passageway similar to the manner in which a venturi tube is formed. Stated otherwise, the thickness of body member wall 24 increases moving in the direction from the opposite ends of body member 12 toward the center point $C_L$. The interior diameter Z is the point along the longitudinal axis through passageway 16 that has the smallest diameter. Interior diameter Z thus represents a constriction in the passageway.

In the preferred embodiment shown in FIG. 2 the interior diameter of passageway 16 decreases gradually and smoothly radially inwardly moving from the opposite outer ends of body 12 toward center point $C_L$, which as noted is the point along the longitudinal axis that has the smallest interior diameter. The passageway is symmetric on either side of center point $C_L$.

This structure shown in FIG. 2 is configured to retain, store and organize a cord 14 folded into a bundle as shown in FIG. 1 and inserted into passageway 16. When cord 14 is folded into a bundle and received into passageway 16 as shown in FIG. 1, the relatively thicker outer end portions of the bundle where the cord is folded over itself (i.e., the portions of the bundle having the greatest circumferential measurement) lie outside of the outer opposite ends of body member 12. The center portion of the bundle is relatively thinner than the outer end portions, resulting in a figure eight type cord configuration in which the bundle has a concave curve relative to the longitudinal axis through the bundle. Since most cords—for instance, electrical power cords—are somewhat resilient, when folded over onto themselves as shown in FIG. 1 the portion of the cords on the outer opposite ends has a tendency to be urged outwardly, transverse to the longitudinal axis of the bundle, by the resiliency of the cord. When the cord is inserted into body member 12 as shown in FIG. 2, the resiliency of the cord causes the cord to naturally conform to the curved interior dimensions of passageway 16 with the center portion of the cord somewhat constricted at diameter Z by the surface of the interior wall bearing on the bundle of cord. Because the outer, folded over ends of the cord lie external to body member 12, the relative increased thickness of the bundled cord and the natural resiliency of cord results in the cord being frictionally retained in the cord organizer. Because interior diameter of passageway 16 decreases smoothly radially inwardly toward the constricted throat defined by center point $C_L$, there are no unneeded stresses on the cord received in the passageway and the cord is retained in the passageway in a position that the cord naturally assumes when folded in the manner shown.

Cord organizer 10 may be manufactured in any size to accommodate any particular cord or wiring. For a relatively large electrical cord such as a typical extension cord the length of body member 12 will be relatively longer than the length of a body member designed for use with a smaller electrical cord. Similarly, the diameters X, Y and Z are adjusted so that they are relatively larger for larger cords. Moreover, the relative ratios of the diameters at various points in the passageway (e.g., X to Y, X to Z, Y to Z and X to Y to Z) may be widely varied according to the particular cord for which the cord organizer is designed.

To protect the cord the interior wall surface 22 is smooth, as are the edges of the openings of passageway 16 at the outer ends of body member 12. Body member 12 is preferably made in a unitary rigid or semi-rigid piece of a suitable plastic material. Other materials, however, including metal, wood, or cardboard will also suffice. When body member 12 is made from plastic it is injection molded in a single piece according to well-known injection molding techniques.

The cord holder of the present invention may be used with cords that are in use with appliances and electronic equipment such as computers and fax machines, where the length of the cord exceeds the amount needed to stretch from the electrical outlet to the appliance. The holder may just as well be used to organize telephone cords that are longer than needed in a particular setting. Similarly, the organizer may be used to keep unused cords neatly organized and stored without tangling, for example, temporary use cords such as those attached to small appliances, hair dryers, curling irons and the like.

Figure 3:
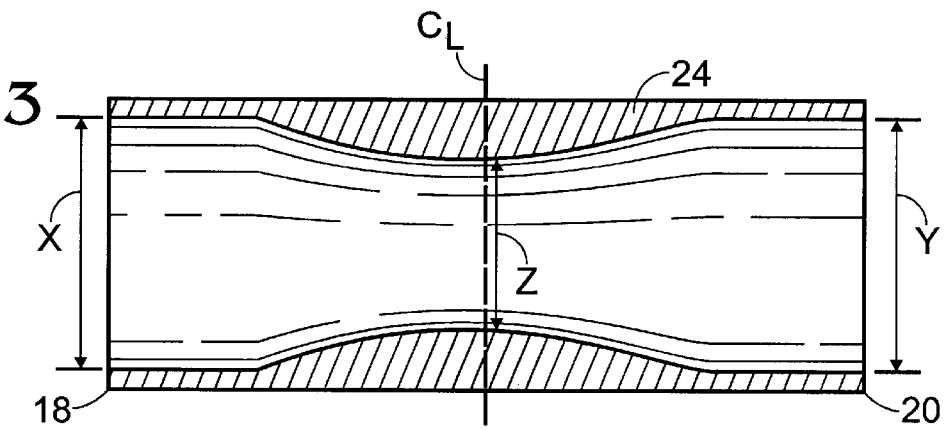
FIG. 3 is a cross sectional view of an alternate embodiment of a cord organizer according to the present invention.
Figure 4:
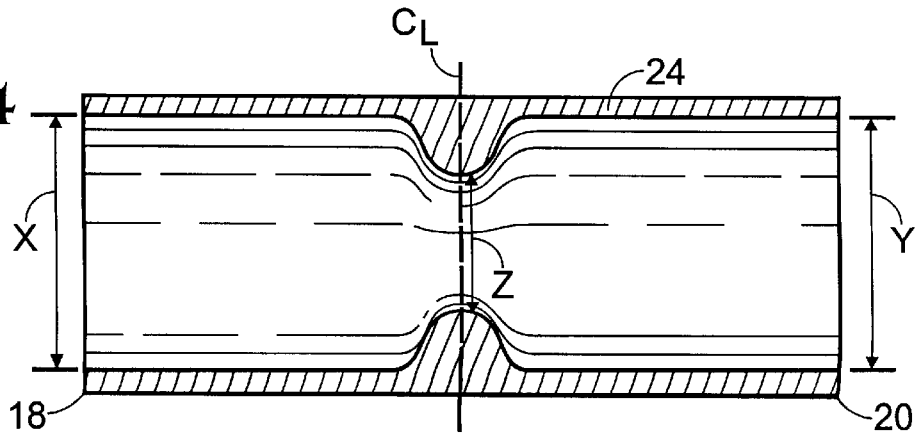
FIG. 4 is a cross sectional view of yet another alternate embodiment of a cord organizer according to the present invention.

Various alternate embodiments may be made without departing from the invention. For example, alternate embodiments are shown in FIGS. 3 and 4. With regard to the embodiment of FIG. 3, the thickness of wall 24 is constant for a short distance moving from outer ends 18 and 20 of body member 12 inwardly toward center point $C_L$, with the wall thickness gradually increasing relatively nearer center point $C_L$ to define constricted diameter Z than with the embodiment of FIG. 2. Stated otherwise, interior diameters X and Y are constant for a distance along the longitudinal axis through body member 12 prior to the points at which the interior diameter of passageway 16 begins decreasing smoothly radially inwardly toward center point $C_L$.

Yet another alternate embodiment of the present invention is shown in FIG. 4, in which the portion of body member 12 that has a thickened wall 24 to define constricted diameter Z is relatively small compared to the overall length of the body member. The slope of the interior wall surface is greater than the embodiments of FIGS. 2 and 3.

While the exterior surface of cord organizer 10 is shown as a cylinder, there is no reason why the present invention could not be formed as a body having any outer dimensions so long as the passageway through the body is formed as disclosed herein. Moreover, the constriction formed in the passageway through the body member (i.e., at diameter Z) may be in positions other than at or near the center point of the passageway through the body. For instance, the constriction at diameter Z could be at or near one of the opposite ends of the passageway, in which case a cord received in the passageway would nonetheless be held generally in a figure eight configuration. Further, while the passageway shown in the preferred embodiment is symmetric on either side of the constricted point at diameter Z, the passageway could be formed asymmetrically. And while in the preferred embodiments of the invention the passageway is circular, the cross sectional configuration of the passageway could be other than circular so long as the passageway included a venturi-like constriction.

While the present invention has been described in terms of a preferred embodiment and various alternates, it will be appreciated by one of ordinary skill that the spirit and scope of the invention is not limited to those embodiments, but extend to the various modifications and equivalents as defined in the appended claims.

What is claimed is:

1. A cord holder for receiving and holding a bundled cord such as an electrical power cord, wiring, rope and the like folded over on itself in an accordion-like manner, comprising:

an elongate cylindrical body member having opposite ends and a longitudinal bore therethrough defining a longitudinal interior passageway through the body member, the passageway having a first interior diameter at the first end thereof, a second interior diameter at the second end thereof, and a third interior diameter between the opposite ends, wherein the third interior diameter is smaller than the first and second interior diameters and the third interior diameter is uniform in cross section transverse to the longitudinal axis through said passageway.

2. The cord holder of claim 1 wherein the first interior diameter is substantially equal to the second interior diameter.

3. The cord holder of claim 2 wherein the third interior diameter is near the center of the passageway between the opposite ends.

4. The cord holder of claim 3 in which the interior wall of the passageway is curved smoothly and gradually radially inwardly in the direction from the opposite ends of the passageway toward the third interior diameter to define a passageway having an interior wall that is a smooth and gradual surface.

5. The cord holder of claim 1 formed of a unitary piece of a rigid material.

6. The cord holder of claim 1 wherein the interior surface of the passageway defines a smoothly and continuously radially inwardly curved wall extending from the opposite ends of the passageway axially toward the center point of the passageway between the opposite ends thereof.

7. A cord holder for receiving and holding a folded and bundled cord such as an electrical power cord, wiring, rope and the like, comprising:

a body having a bore therethrough that is substantially circular in cross section and defines an interior passageway, the passageway having a constriction formed therein between the opposite ends; said bore defining a first interior diameter at the first end thereof, a second interior diameter at the second end thereof, and the constriction defines a third interior diameter between the first and second ends; wherein the body is configured for receiving a bundled cord in the bore and for holding the bundled cord in a substantially figure eight configuration.

8. The cord holder of claim 7 wherein the bore is defined by an interior wall that is a smooth and gradual surface.

9. The cord holder of claim 7 formed in a unitary piece.

10. The cord holder of claim 9 formed of a rigid material.

11. The cord holder of claim 7 wherein the bore is other than circular in cross section.

\* \* \* \* \*